(12) United States Patent
Wendel et al.

(10) Patent No.: US 12,250,476 B2
(45) Date of Patent: Mar. 11, 2025

(54) ADJUSTABLE VERTICAL FIELD OF VIEW

(71) Applicant: Waymo LLC, Mountain View, CA (US)

(72) Inventors: Andreas Wendel, Mountain View, CA (US); Jeremy Dittmer, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/648,692

(22) Filed: Jan. 24, 2022

(65) Prior Publication Data

US 2022/0150423 A1    May 12, 2022

Related U.S. Application Data

(63) Continuation of application No. 17/243,992, filed on Apr. 29, 2021, now Pat. No. 11,653,108, which is a
(Continued)

(51) Int. Cl.
*H04N 25/441* (2023.01)
*H04N 25/531* (2023.01)

(52) U.S. Cl.
CPC ......... *H04N 25/441* (2023.01); *H04N 25/531* (2023.01)

(58) Field of Classification Search
CPC .... H04N 5/3452; H04N 5/3532; H04N 5/345; H04N 5/3692; B60W 40/02; B60W 2420/403
(Continued)

(56) References Cited

U.S. PATENT DOCUMENTS 6,839,452 B1    1/2005  Yang
9,164,511 B1 *  10/2015 Ferguson ............. G05D 1/0088
(Continued)

FOREIGN PATENT DOCUMENTS

JP    2006322797 A    11/2006
JP    2011517632 A    6/2011
(Continued)

OTHER PUBLICATIONS

International Search Report and Written Opinion for corresponding PCT application No. PCT/US2018/065119, dated Jun. 30, 2020.

*Primary Examiner* — Lin Ye
*Assistant Examiner* — Chan T Nguyen
(74) *Attorney, Agent, or Firm* — McDonnell Boehnen Hulbert & Berghoff LLP

(57) ABSTRACT

Examples described may related to an imaging sensor used by a vehicle, including a light sensor. The light sensor comprises a plurality of cells aligned in a plurality of horizontal rows and a plurality of vertical columns. The apparatus further includes an optical system configured to provide the light sensor with a field of view of an external environment of the apparatus. Additionally, the system includes a processing unit configured to: divide the plurality of horizontal rows of the light sensor into one or more enabled rows and one or more disabled rows; obtain image data from the light sensor by sampling one or more cells in the one or more enabled rows; and store the received image data in a memory.

19 Claims, 11 Drawing Sheets

Related U.S. Application Data continuation of application No. 16/214,572, filed on Dec. 10, 2018, now Pat. No. 10,999,539.

(60) Provisional application No. 62/610,339, filed on Dec. 26, 2017.

(58) Field of Classification Search
USPC .......................................................... 348/302
See application file for complete search history.

(56) References Cited

U.S. PATENT DOCUMENTS

| | | |
|---|---|---|
| 2004/0016870 A1 | 1/2004 | Pawlicki |
| 2005/0057674 A1 | 3/2005 | Krymski |
| 2006/0243882 A1 | 11/2006 | Tanida |
| 2007/0152804 A1* | 7/2007 | Breed ................. G01S 19/17 701/301 |
| 2008/0079814 A1 | 4/2008 | Nobuoka |
| 2008/0097699 A1* | 4/2008 | Ono ................. B62D 15/0265 701/300 |
| 2011/0044507 A1 | 2/2011 | Strauss |
| 2011/0228114 A1 | 9/2011 | Tominaga |
| 2015/0062013 A1* | 3/2015 | Solomon ............... G06F 3/0346 345/158 |
| 2015/0085150 A1 | 3/2015 | Silverstein |
| 2015/0110344 A1* | 4/2015 | Okumura ............ G06V 20/588 382/103 |
| 2015/0248131 A1* | 9/2015 | Fairfield ............. G05D 1/0027 701/2 |
| 2015/0358571 A1* | 12/2015 | Dominguez Castro ................... H04N 25/771 348/308 |
| 2016/0034770 A1* | 2/2016 | Peterson ............... G06V 20/584 382/104 |
| 2016/0050342 A1 | 2/2016 | Kimura |
| 2016/0263997 A1 | 9/2016 | Mizutani |
| 2017/0215821 A1 | 8/2017 | Ojelund |
| 2017/0242117 A1* | 8/2017 | Izzat ....................... G01S 17/66 |
| 2017/0259728 A1* | 9/2017 | Nagata ................. G01S 13/867 |
| 2017/0300764 A1* | 10/2017 | Kakegawa ........... G06V 20/588 |
| 2018/0086266 A1 | 3/2018 | Yamaguchi |
| 2018/0112980 A1 | 4/2018 | Diem |
| 2018/0225540 A1 | 8/2018 | Eli |
| 2018/0281783 A1* | 10/2018 | Schwindt .............. B60W 40/02 |
| 2019/0098217 A1 | 3/2019 | Zhou |
| 2019/0114489 A1* | 4/2019 | Jackson ................ G06V 10/82 |
| 2019/0164362 A1* | 5/2019 | Javid ................... G07C 5/0816 |
| 2019/0199946 A1 | 6/2019 | Wendel |

FOREIGN PATENT DOCUMENTS

| | | |
|---|---|---|
| JP | 2013026882 A | 2/2013 |
| JP | 2013175873 | 9/2013 |
| JP | 2014187550 | 10/2014 |
| JP | 2017125985 | 7/2017 |
| JP | 2017212755 | 11/2017 |
| JP | 2021507552 A | 7/2022 |
| WO | 2007045714 A1 | 4/2007 |
| WO | 2015083228 A1 | 6/2015 |
| WO | 2016190437 A1 | 12/2016 |
| WO | 2017197651 A1 | 11/2017 |

\* cited by examiner

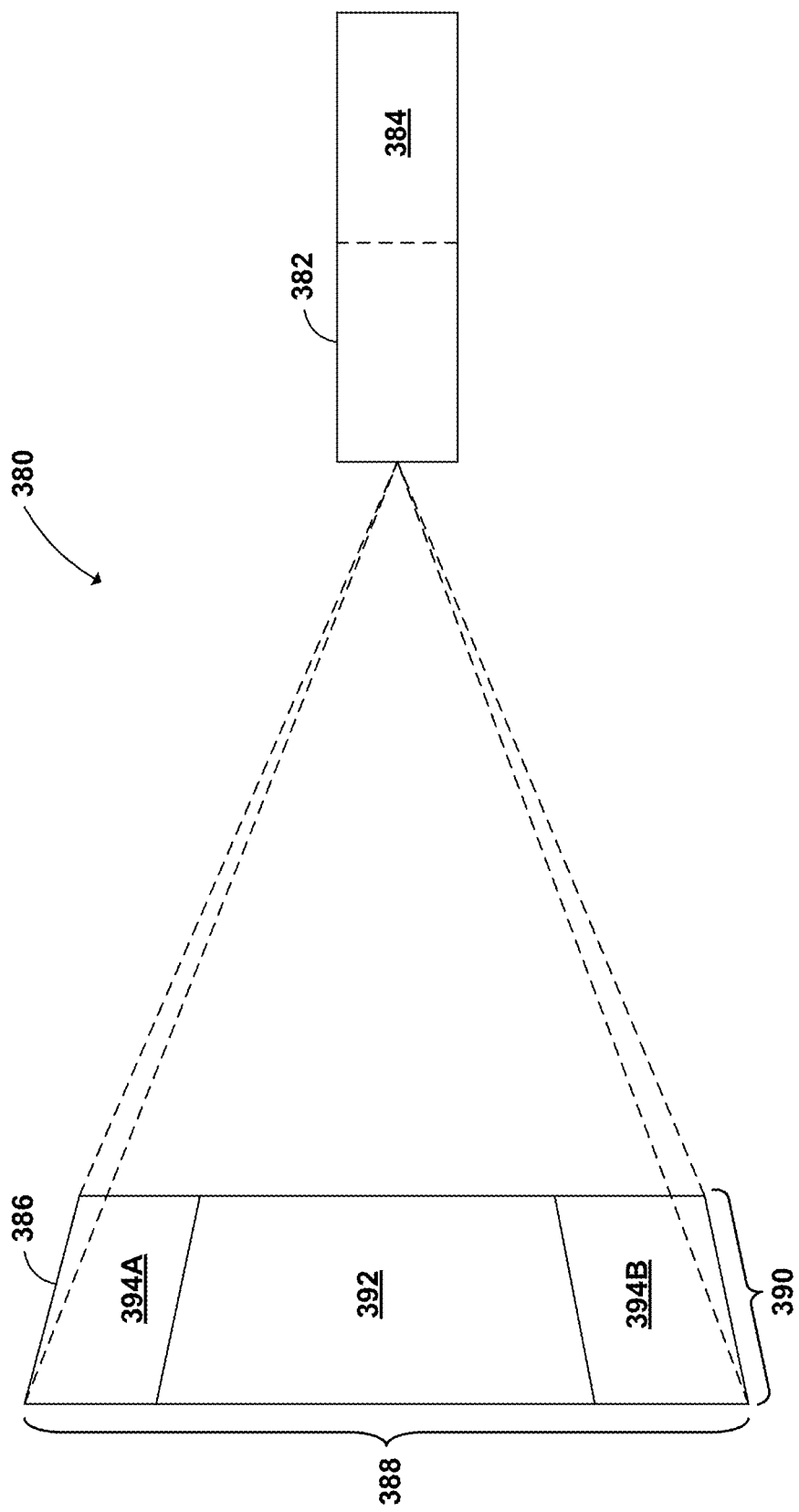

ADJUSTABLE VERTICAL FIELD OF VIEW

CROSS REFERENCE TO RELATED APPLICATIONS

The present application is a continuation of U.S. patent application Ser. No. 17/243,992, filed Apr. 29, 2021, which is a continuation of U.S. patent application Ser. No. 16/214,572 (now U.S. Pat. No. 10,999,539), filed on Dec. 10, 2018, which claims priority to U.S. Provisional Patent Application Ser. No. 62/610,339, filed on Dec. 26, 2017, the entire contents of each is herein incorporated by reference.

BACKGROUND

A vehicle could be any wheeled, powered vehicle and may include a car, truck, motorcycle, bus, etc. Vehicles can be utilized for various tasks such as transportation of people and goods, as well as many other uses.

Some vehicles may be partially or fully autonomous. For instance, when a vehicle is in an autonomous mode, some or all of the driving aspects of vehicle operation can be handled by an autonomous vehicle system (i.e., any one or more computer systems that individually or collectively function to facilitate control of the autonomous vehicle). In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

In one aspect, the present application describes an apparatus. The apparatus includes a light sensor. The light sensor comprises a plurality of cells aligned in a plurality of horizontal rows and a plurality of vertical columns. The apparatus further includes an optical system configured to provide the light sensor with an overall vertical field of view and an overall horizontal field of view of an external environment of the apparatus. Each horizontal row provides a corresponding portion of the overall vertical field of view and each vertical column provides a corresponding portion of the overall horizontal field of view. Additionally, the system includes a processing unit configured to divide the plurality of horizontal rows of the light sensor into one or more enabled rows and one or more disabled rows. The processing unit is also configured to obtain image data from the light sensor by sampling one or more cells in the one or more enabled rows without sampling the cells in the one or more disabled rows, where the image data images a portion of the overall vertical field of view. The imaged portion of the vertical field of view corresponds to the one or more portions of the vertical field of view provided by the one or more enabled rows. In addition, the processing unit is configured to store the received image data in a memory of the apparatus.

In another aspect, the present application describes a method of operating an optical system. The method includes providing light to a sensor of the optical system. The sensor comprises a plurality of cells aligned in a plurality of horizontal rows and a plurality of vertical columns and the sensor is configured with an overall vertical field of view and an overall horizontal field of view of an external environment of the apparatus. Each horizontal row provides a corresponding portion of the overall vertical field of view and each vertical column provides a corresponding portion of the overall horizontal field of view. The method also includes selecting one or more rows of the plurality of horizontal rows of the light sensor. The method further includes enabling the light sensor to provide image data from one or more cells in the selected one or more rows. Additionally, the method includes receiving the image data from the enabled light sensor, where the image data images a portion of the overall vertical field of view and the imaged portion of the vertical field of view corresponds to the one or more portions of the vertical field of view provided by the selected one or more rows. Further, the method includes storing the received image data in a memory of the apparatus.

In still another aspect, the present application describes an article of manufacture including a non-transitory computer-readable medium having stored thereon instructions that, when executed by a processor in a computing system, causes the computing system to perform operations. The operations may include providing light to a sensor of the optical system. The sensor comprises a plurality of cells aligned in a plurality of horizontal rows and a plurality of vertical columns and the sensor is configured with an overall vertical field of view and an overall horizontal field of view of an external environment of the apparatus. Each horizontal row provides a corresponding portion of the overall vertical field of view and each vertical column provides a corresponding portion of the overall horizontal field of view. The operations also include selecting one or more rows of the plurality of horizontal rows of the light sensor. The operations further include enabling the light sensor to provide image data from one or more cells in the selected one or more rows. Additionally, the operations include receiving the image data from the enabled light sensor, where the image data images a portion of the overall vertical field of view and the imaged portion of the vertical field of view corresponds to the one or more portions of the vertical field of view provided by the selected one or more rows. Further, the operations include storing the received image data in a memory of the apparatus.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE DRAWINGS

FIG. 3C is a conceptual illustration of an imaging operation of an example apparatus.

DETAILED DESCRIPTION

Figure 1:
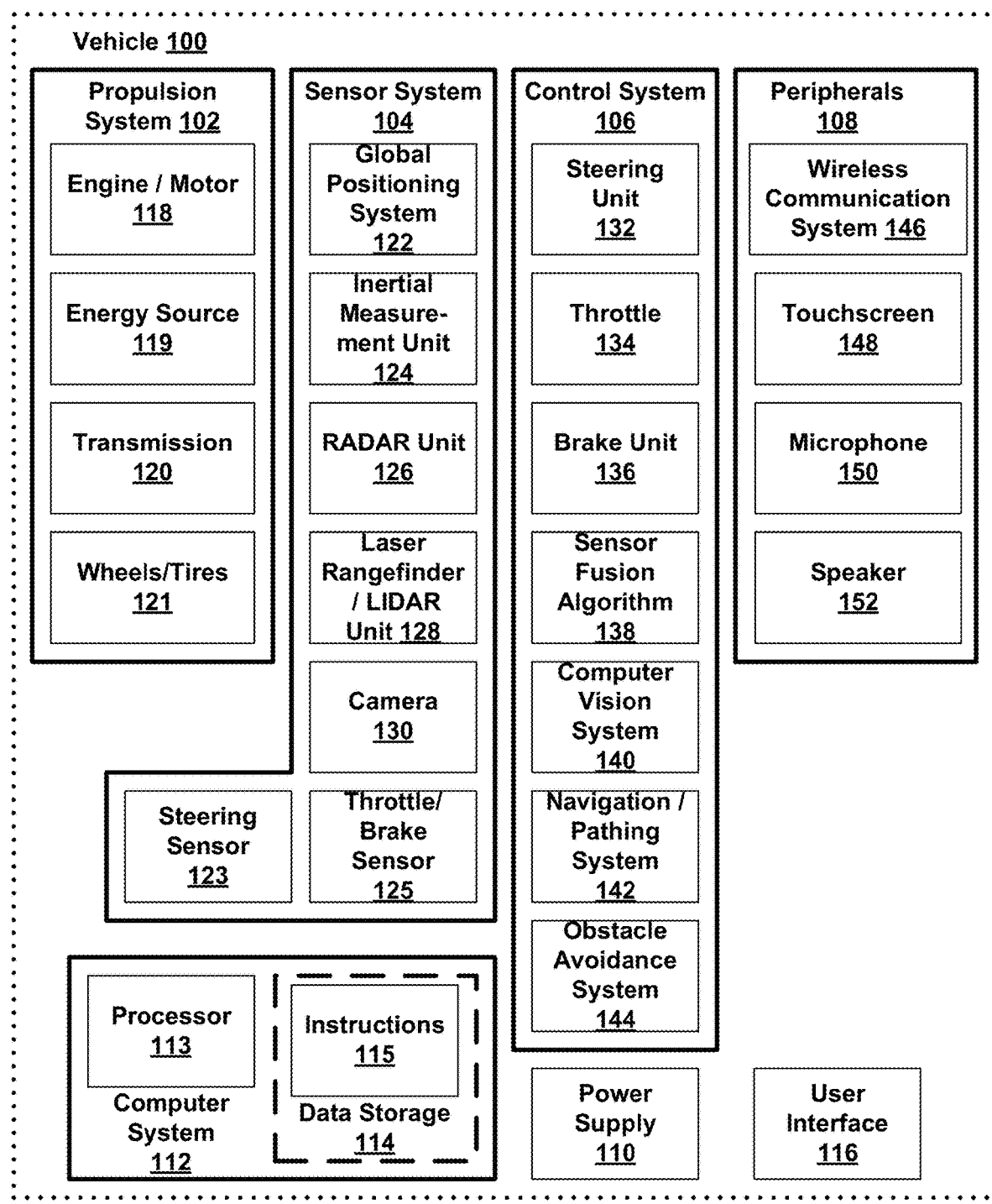
FIG. 1 is a functional block diagram illustrating a vehicle, according to an example implementation.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein. Additionally, in this disclosure, unless otherwise specified and/or unless the particular context clearly dictates otherwise, the terms "a" or "an" means at least one, and the term "the" means the at least one. Yet further, the term "enabled" may mean active and/or functional, not necessarily requiring an affirmative action to turn on. Similarly, the term "disabled" may mean non-active and/or non-functional, not necessarily requiring an affirmative action to turn off.

Furthermore, the particular arrangements shown in the Figures should not be viewed as limiting. It should be understood that other implementations might include more or less of each element shown in a given Figure. Further, some of the illustrated elements may be combined or omitted. Yet further, an example implementation may include elements that are not illustrated in the Figures.

In practice, an autonomous or semi-autonomous vehicle system may use data representative of the vehicle's environment to identify objects. The vehicle system may then use the objects' identification as a basis for performing another action, such as instructing the vehicle to act in a certain way. For instance, if the object is a stop sign, the vehicle system may instruct the vehicle to slow down and stop before the stop sign, or if the object is a pedestrian in the middle of the road, the vehicle system may instruct the vehicle to avoid the pedestrian.

In some scenarios, a vehicle may use a camera to image the environment around the vehicle. The imaging of the environment may be used for object identification and/or navigation. The optical camera may have an image sensor (i.e., light sensor), such as a Complementary Metal-Oxide-Semiconductor (CMOS) image sensor. The light sensor may include a plurality of sensor cells configured in rows and columns. In order to capture image data, the cells of the sensor may be sampled to obtain the image data. The cells of the light sensor are aligned in a plurality of horizontal rows and a plurality of vertical columns. The light sensor may receive light from the environment via an optical system (e.g., a lens). The optical system provides the light sensor with an overall vertical field of view and an overall horizontal field of view of the environment.

The light sensor may be configured with a rolling shutter. A rolling shutter generally will iteratively sample the light sensor to capture image data. The data from the light sensor may form an image, a plurality of images, or a video. For example, in a traditional image sensor, a rolling shutter may iteratively sample the light sensor one row of cells at a time. When sampling a traditional image sensor that has a rolling shutter, objects in the field of view of the sensor that have a high speed may appear distorted. Such distortions are caused by the iterative sampling. Because lines of cells are sampled iteratively, the object being imaged moves slightly between each sampling. Therefore, each line will be sampled a slightly later time than the previous line. Due to the delay in sampling respective lines an object having horizontal motion may have a horizontal skew. For example, a vehicle moving across the field of view of the sensor may have a horizontal skew and vertical compression (or expansion) that distorts the vehicle. This skew may be troublesome for processing based on the horizontal location of objects in an image.

The light sensor of the present disclosure may be sampled with a rolling shutter that samples the cells of the sensor in vertical columns (e.g. vertical with respect to the orientation of the vehicle). By sampling the light sensor in columns as opposed to rows, the distortion caused by the iterative sampling may be mitigated. Rather than a horizontal skew, there may be a vertical skew and horizontal compression (or expansion) of moving objects. In some instances, having a horizontal compression or expansion may be more desirable than the horizontal skew of the traditional sensor.

Additionally, the image sensor may be coupled to a processor configured to perform one or more image processing tasks. The image processing may include image compression, object recognition, navigation routing, etc. When the light sensor is used to capture image data, the image data may consume a relatively large amount of data. Because of this large amount of image data, storage, processing, and moving the image data may be computationally and memory intensive. In order to reduce the computational and memory needs of the system, only a portion of the sensor may be enabled at any given time. To achieve this, a region of the sensor may be disabled and sampling of sensor cells may only be performed on the enabled portion. The processor coupled to the optical system may divide the plurality of horizontal rows (or vertical columns) of the light sensor into one or more enabled rows and one or more disabled rows (or one or more enabled columns and one or more disabled columns). For example, half of the cells of the sensor may be enabled at any given time. The disabled portion may include one or more regions of the sensor. For example, the disabled regions may be a plurality of rows at the top or bottom of the sensor. In a default mode, the top 25% of the rows of the sensor and the bottom 25% of the rows of the sensor may be disabled. This would leave the middle 50% of the rows enabled.

The processor may obtain image data from the light sensor by sampling one or more cells in the one or more enabled rows by way of the rolling shutter without sampling the cells in the one or more disabled rows. The image data captured by the optical system images a portion of the overall vertical field of view corresponding to the one or more portions of the vertical field of view provided by the one or more enabled rows. That is, image data may be created only from the enabled rows of the image sensor, therefore only a subset of the overall field of view may be imaged.

The region of the light sensor that is enabled may correspond to a portion of the overall field of view of the light sensor. By disabling a top and/or bottom portion of the light sensor, the field of view may be reduced to only contain a portion of what would have been the full image of the fully-enabled sensor. In some examples, the processor may be further configured to adjust the enabled portion of the sensor. The processor may enable or disable additional rows of the sensor to change the field of view that is imaged. In practice, this may cause the field of view to adjust in an upward or downward direction or expand or contract the field of view. The enabled portion may be adjusted to capture a different field of view than a default field of view. For example, when a vehicle pulls up to a stoplight, the stoplight may be mounted higher than normal. In response processor may adjust the enabled rows of the sensor so that the field of view captures the stoplight.

The processor may adjust the portion of the sensor that is enabled in many different ways. In some examples, the portion of the sensor is enabled is based on map data stored in the memory of the apparatus. For example, the map data may indicate a change in the grade of the roadway or an object near the roadway may be located higher or lower than normal and the processor may responsively adjust the enabled region of the sensor to keep a portion of the roadway within the field of view of the sensor or to make sure the object is within the field of view of the sensor. In another example, the system may include an inertial measurement unit (IMU) and the portion of the sensor that is enabled may be based on data from the IMU. For example, the IMU data may indicate a change in the grade of the roadway and the processor may responsively adjust the enabled region of the sensor to keep a portion of the roadway within the field of view of the sensor. In some further examples, the portion of the sensor is enabled based on an object detected in the image data. For example, a road sign may be located partially in the field of view of the sensor and the processor may adjust the enabled region in order to have the full road sign located in the field of view.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some implementations, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112, data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/LIDAR 128, camera 130, steering sensor 123, and throttle/brake sensor 125, among other possible sensors. In some implementations, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some implementations, radar 126 may correspond to a mountable radar system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other implementations, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the implementation, computer system 112 could be operable to monitor many aspects of vehicle 100 and its subsystems. In some implementations, computer system 112 may disable some or all functions of the vehicle 100 based on signals received from sensor system 104.

The components of vehicle 100 could be configured to work in an interconnected fashion with other components within or outside their respective systems. For instance, in an example implementation, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some implementations, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

Figure 2:
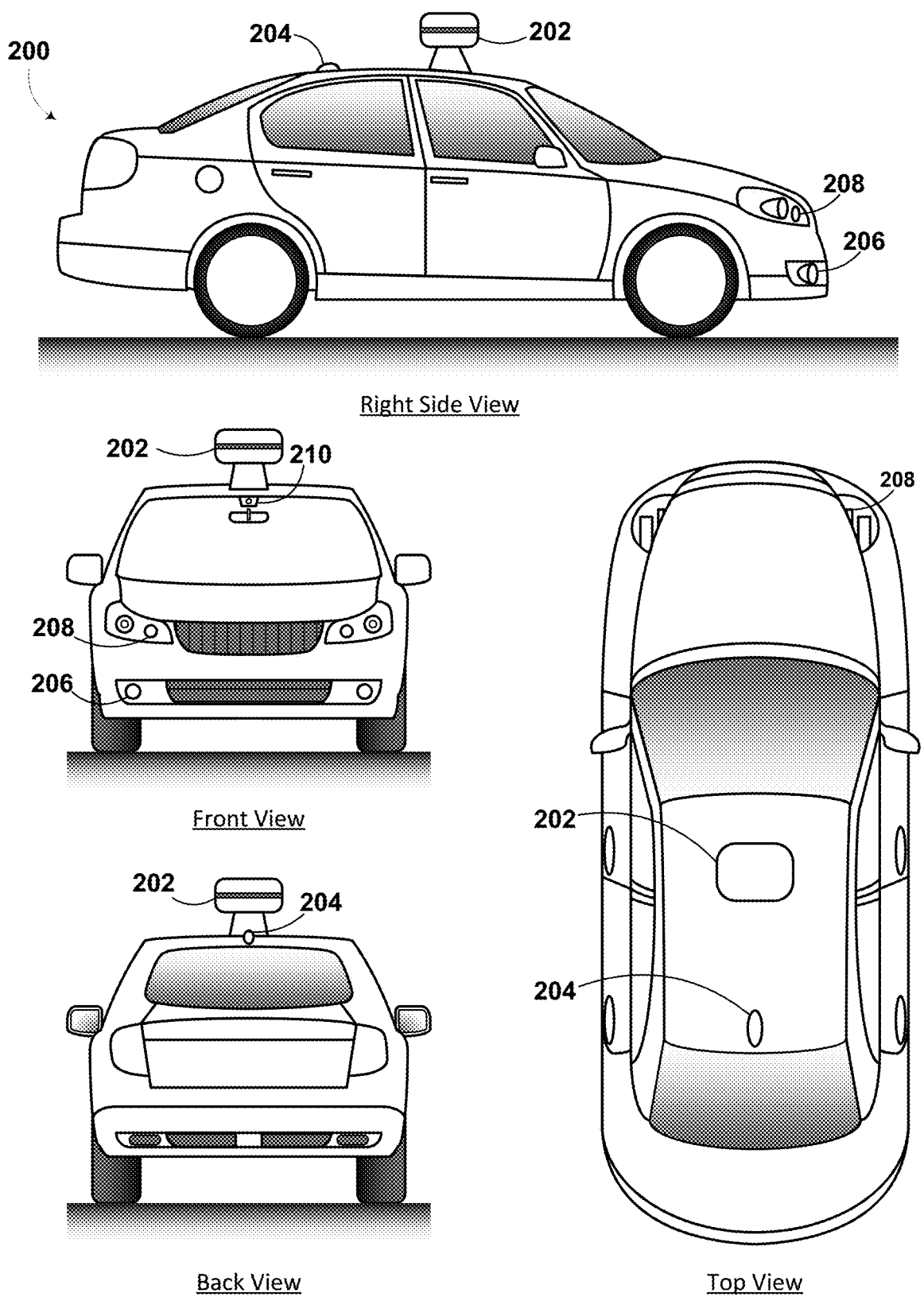
FIG. 2 is a conceptual illustration of a physical configuration of a vehicle, according to an example implementation.

FIG. 2 depicts an example physical configuration of vehicle 200, which may represent one possible physical configuration of vehicle 100 described in reference to FIG. 1. Depending on the implementation, vehicle 200 may include sensor unit 202, wireless communication system 204, radio unit 206, deflectors 208, and camera 210, among other possible components. For instance, vehicle 200 may include some or all of the elements of components described in FIG. 1. Although vehicle 200 is depicted in FIG. 2 as a car, vehicle 200 can have other configurations within examples, such as a truck, a van, a semi-trailer truck, a motorcycle, a golf cart, an off-road vehicle, or a farm vehicle, among other possible examples.

Sensor unit 202 may include one or more sensors configured to capture information of the surrounding environment of vehicle 200. For example, sensor unit 202 may include any combination of cameras, radars, LIDARs, range finders, radio devices (e.g., Bluetooth and/or 802.11), and acoustic sensors, among other possible types of sensors. In some implementations, sensor unit 202 may include one or more movable mounts operable to adjust the orientation of sensors in sensor unit 202. For example, the movable mount may include a rotating platform that can scan sensors so as to obtain information from each direction around the vehicle 200. The movable mount of sensor unit 202 may also be movable in a scanning fashion within a particular range of angles and/or azimuths.

In some implementations, sensor unit 202 may include mechanical structures that enable sensor unit 202 to be mounted atop the roof of a car. Additionally, other mounting locations are possible within examples.

Wireless communication system 204 may have a location relative to vehicle 200 as depicted in FIG. 2, but can also have different locations within implementations. Wireless communication system 200 may include one or more wireless transmitters and one or more receivers that may communicate with other external or internal devices. For example, wireless communication system 204 may include one or more transceivers for communicating with a user's device, other vehicles, and roadway elements (e.g., signs, traffic signals), among other possible entities. As such, vehicle 200 may include one or more vehicular communication systems for facilitating communications, such as dedicated short-range communications (DSRC), radio frequency identification (RFID), and other proposed communication standards directed towards intelligent transport systems.

Camera 210 may have various positions relative to vehicle 200, such as a location on a front windshield of vehicle 200. As such, camera 210 may capture images of the environment of vehicle 200. As illustrated in FIG. 2, camera 210 may capture images from a forward-looking view with respect to vehicle 200, but other mounting locations (including movable mounts) and viewing angles of camera 210 are possible within implementations. In some examples, camera 210 may correspond to one or more visible light cameras. Alternatively or additionally, camera 210 may include infrared sensing capabilities. Camera 210 may also include optics that may provide an adjustable field of view.

Figure 3A:
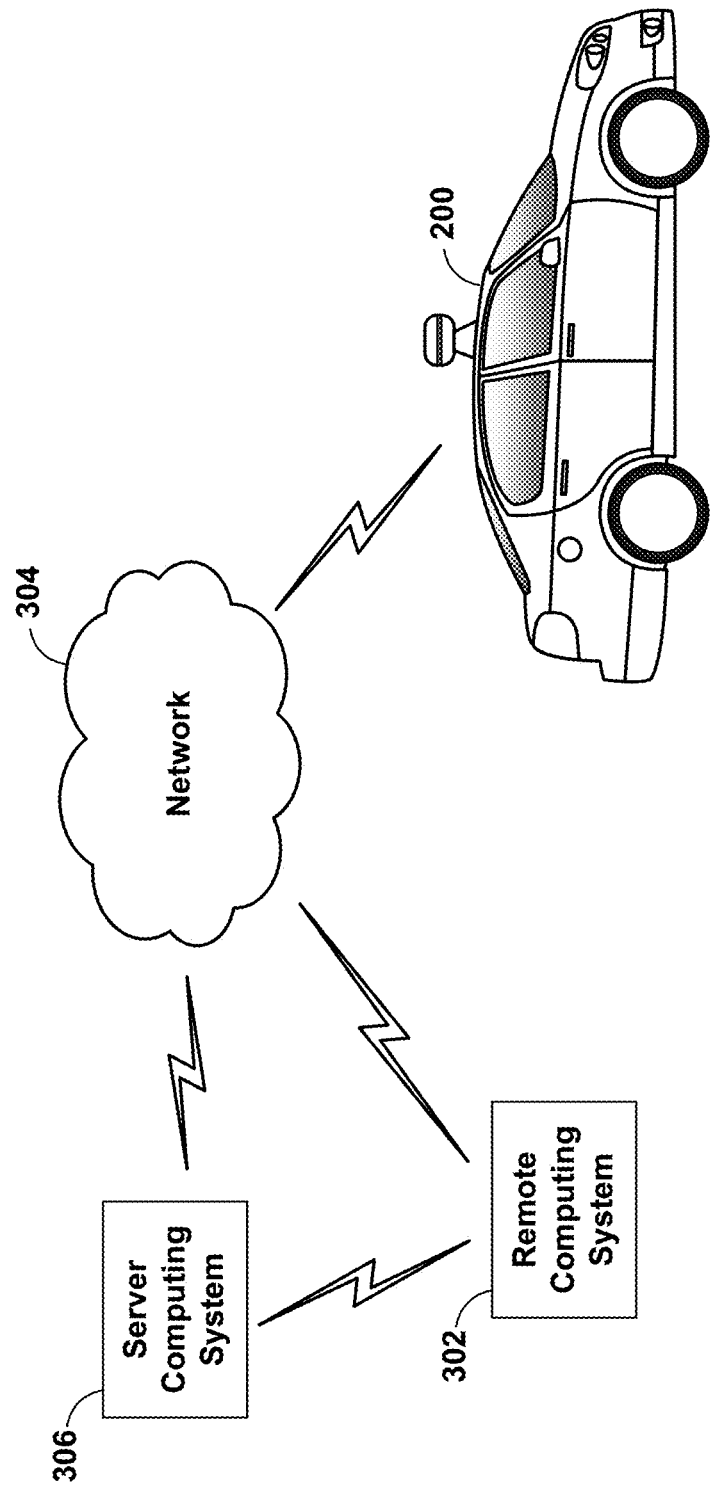
FIG. 3A is a conceptual illustration of wireless communication between various computing systems related to an autonomous vehicle, according to an example implementation.

FIG. 3A is a conceptual illustration of wireless communication between various computing systems related to an autonomous vehicle, according to an example implementation. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous mode that enables a control system to safely navigate vehicle 200 between destinations using sensor measurements. When operating in an autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some implementations, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some implementations, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some implementations of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, or perhaps server computing system 306, or a computing system local to vehicle 200) may operate to use a camera to capture images of the environment of an autonomous vehicle. In general, at least one computing system will be able to analyze the images and possibly control the autonomous vehicle.

In some implementations, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some implementations, the vehicle may have more than one camera positioned in different orientations. Also, in some implementations, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distance and position to various reflecting objects may be determined. In some implementations, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., light, such as that from a gas or diode laser, or other possible light source) that will be reflected by a target objects near the vehicle. The laser range finder may be able to capture the reflected electromagnetic (e.g., laser) signals. The captured reflected electromagnetic signals may enable the range-finding system (or processing system) to determine a range to various objects. The range-finding system may also be able to determine a velocity or speed of target objects and store it as environment data.

Additionally, in an example, a microphone may be configured to capture audio of environment surrounding the vehicle. Sounds captured by the microphone may include emergency vehicle sirens and the sounds of other vehicles. For example, the microphone may capture the sound of the siren of an emergency vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some implementations it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some implementations, the processing system may be able to combine information from the various sensors in order to make further determinations of the environment of the vehicle. For example, the processing system may combine data from both radar information and a captured image to determine if another vehicle or pedestrian is in front of the autonomous vehicle. In other implementations, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one implementation, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various way depending on the source of the environment data. In some implementations, the environment data may come from a camera and be image or video data. In other implementations, the environment data may come from a LIDAR unit. The vehicle may analyze the captured image or video data to identify objects in the image or video data. The methods and apparatuses may be configured to monitor image and/or video data for the presence of objects of the environment. In other implementations, the environment data may be radar, audio, or other data. The vehicle may be configured to identify objects of the environment based on the radar, audio, or other data.

In some implementations, the techniques the vehicle uses to detect objects may be based on a set of known data. For example, data related to environmental objects may be stored to a memory located in the vehicle. The vehicle may compare received data to the stored data to determine objects. In other implementations, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other implementations, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some implementations, the vehicle may react as if the detected object is present despite the low confidence level. In other implementations, the vehicle may react as if the detected object is not present.

When the vehicle detects an object of the environment, it may also calculate a confidence associated with the specific detected object. The confidence may be calculated in various ways depending on the implementation. In one example, when detecting objects of the environment, the vehicle may compare environment data to predetermined data relating to known objects. The closer the match between the environment data to the predetermined data, the higher the confidence. In other implementations, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some implementations, via a server (e.g., server computing system 306). The human operator of the remote computing system may in turn use the environment data as a basis for responding to the request.

In some implementations, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of vehicle (e.g., a speed and/or direction), among other possible adjustments.

In other implementations, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 3B:
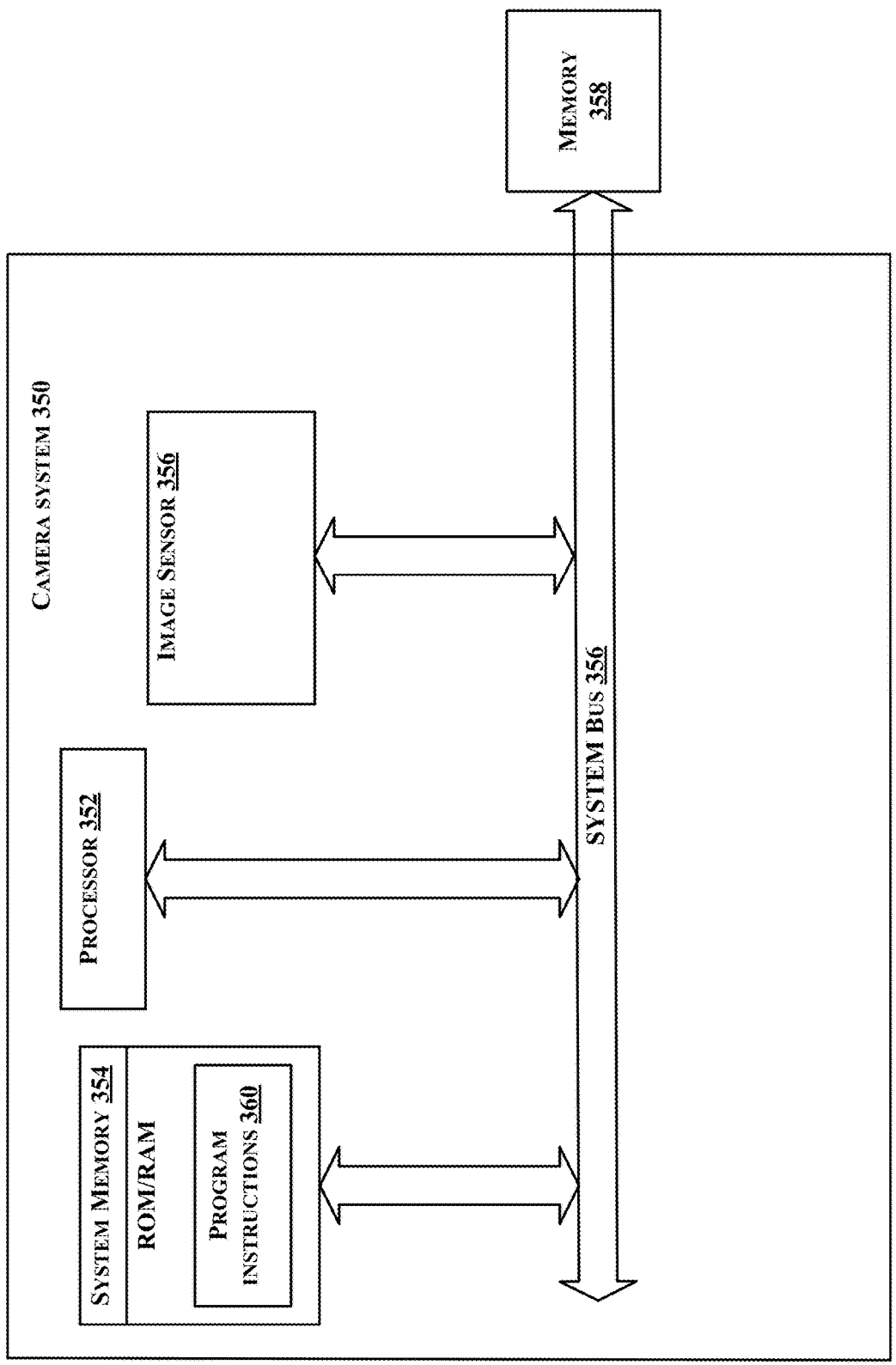
FIG. 3B is a simplified block diagram depicting example components of an example camera system.

FIG. 3B shows a simplified block diagram depicting example components of an example camera system 350. This example camera system 350 could correspond to camera 130.

Camera system 350 may include at least one processor 352 and system memory 354. In an example embodiment, camera system 350 may include a system bus 356 that communicatively connects processor 352 and system memory 354, as well as other components of camera system 350. Depending on the desired configuration, processor 352 can be any type of processor including, but not limited to, a microprocessor (µP), a microcontroller (µC), a digital signal processor (DSP), or any combination thereof. Furthermore, system memory 354 can be of any type of memory now known or later developed including but not limited to volatile memory (such as RAM), non-volatile memory (such as ROM, flash memory, etc.) or any combination thereof. In some examples, the system memory 354 may be a memory cache to temporarily store image data. Additionally, the camera system 350 may be coupled to an external memory 358. The external memory 358 may be a memory located in a different portion of the autonomous vehicle and/or located at a remote computer server. The external memory 358 may be used for longer term storage and/or processing of images. For example, image data in the external memory 358 may be used by a navigation system of the autonomous vehicle.

An example camera system 350 may include various other components as well. For example, the camera system 350 includes an image sensor 356. The image sensor 356 may be an image sensor such as described herein. For example, the image sensor 356 may include a rolling shutter and be configured to have portions selectively enabled or disabled by the processor 352.

Figure 8:
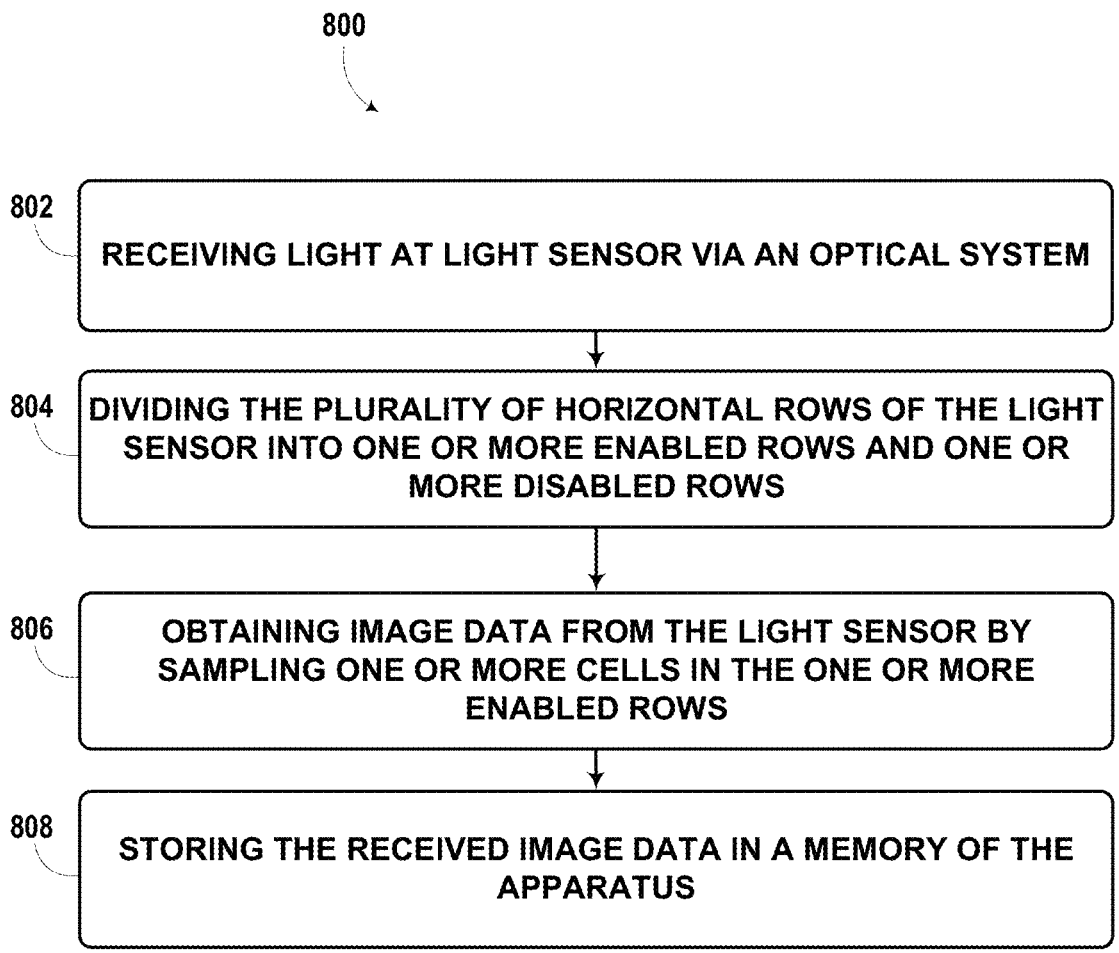
FIG. 8 is a flow chart of a method, according to an example implementation.

According to an example embodiment, camera system 350 may include program instructions 360 that are stored in system memory 354 (and/or possibly in another data-storage medium) and executable by processor 352 to facilitate the various functions described herein including, but not limited to, those functions described with respect to FIG. 8. Although various components of camera system 350 are shown as distributed components, it should be understood that any of such components may be physically integrated and/or distributed according to the desired configuration of the computing system.

FIG. 3C conceptual illustration of an imaging operation of an apparatus that includes an optical system 382 (e.g., a lens) and an image sensor 384. The image sensor 384 could be in a camera, such as camera system 350 shown in FIG. 3B. The optical system 382 provides an overall field of view 386 to the image sensor 384. The overall field of view 386 includes a vertical field of view 388 and a horizontal field of view 390. The overall field of view 386 corresponds to the largest angular extent that the image sensor 384 can image via the optical system 382.

In some examples, at least one portion of the image sensor 384 may be disabled. When at least one portion of the image sensor 384 is disabled, the field of view may be only a portion of the overall field of view 386. As an example, when two portions of the image sensor 384 are disabled, there may be an imaged field of view 392, a top disabled portion of the field of view 394A, and a bottom disabled portion of the field of view 394B. The top disabled portion of the field of view 394A and the bottom disabled portion of the field of view 394B may correspond to the two disabled regions of the image sensor 384.

Figure 4:
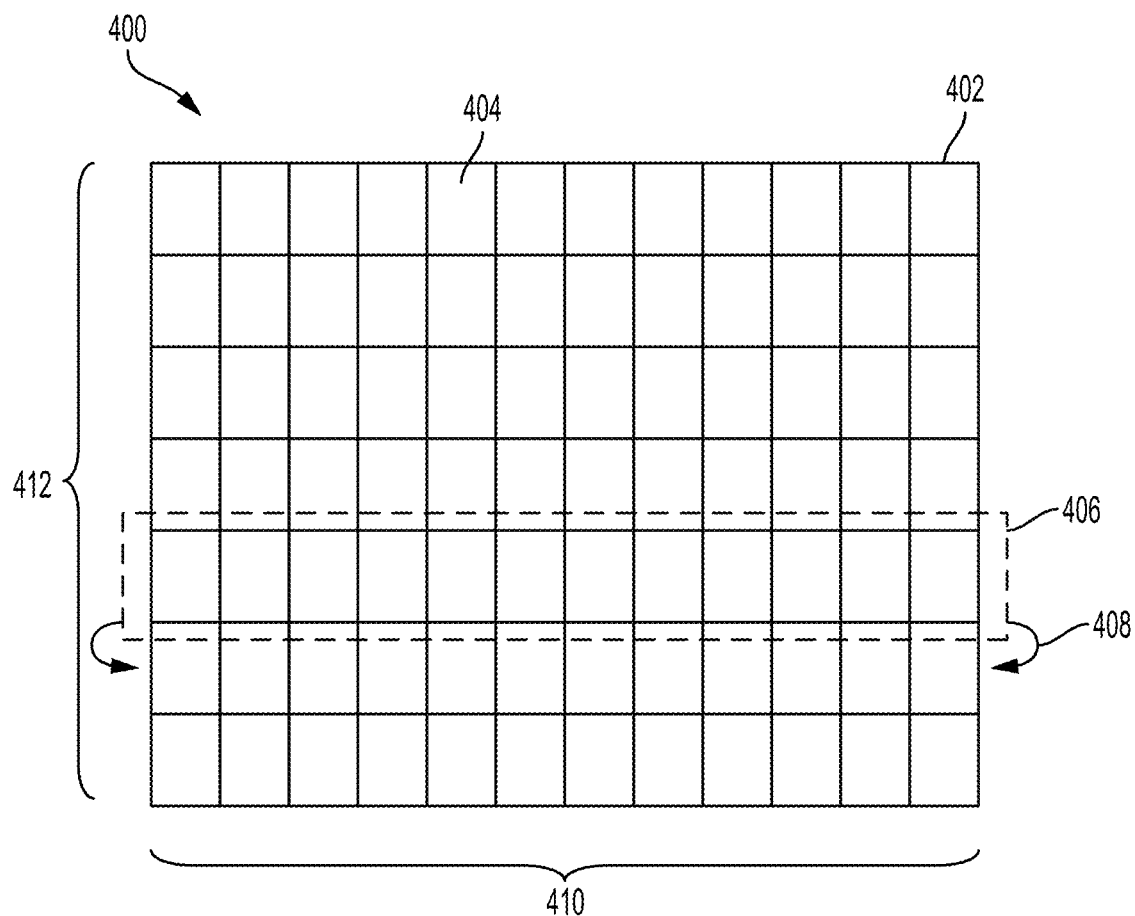
FIG. 4 illustrates a conventional image sensor.

FIG. 4 illustrates a conventional image sensor 400. The image sensor 400 may be a CMOS image sensor. The conventional image sensor 400 may comprise a grid 402 of sensor cells 404. The grid 402 of sensor cells 404 may be arranged in columns 410 and rows 412. In some examples, conventional image sensor 400 may be wider than it is tall (i.e. may have more vertical columns than horizontal rows). During operation, the sensor cells 404 may receive light and convert the light into electrical signals. The electrical signals may correspond to the color and intensity of light that is received by a respective sensor cell.

In order to form an image, a processor, such as a processor described with respect to FIG. 1 and/or FIG. 3B may control the sampling of cells 404 of the image sensor 400. As shown in FIG. 4, the image sensor 400 may be sampled one row 406 at a time. Sampling in this way is known as a rolling shutter.

In some examples, the image sensor 400 may sample more than one one row at a time. The image sensor 400 may be sampled in an iterative fashion and incrementally adjust the sample row 408. The processor may incrementally sample the rows 412 of sensor 400 by iteratively incrementing the sample row 406. In some examples, the iterations may be linear, that is after each row sampled the next row is subsequently sampled. In other examples, the sampling may be performed in different ways.

As previously discussed, in a conventional image sensor 400, a rolling shutter may iteratively sample the traditional image sensor 400 one row 406 of cells at a time. When sampling a traditional image sensor 400 that has a rolling shutter, objects in the field of view of the sensor that have a high speed may appear distorted. Distortions are caused by the iterative sampling of the traditional image sensor 400. Because lines of cells are sampled iteratively, the object being imaged moves slightly between each sampling. Therefore, each line will be sampled a slightly later time than the previous line. Due the delay in sampling respective lines an object having horizontal motion may have a horizontal skew. For example, a vehicle moving across the field of view of the sensor may have a horizontal skew and vertical compression (or expansion) that distorts the vehicle. This skew may be troublesome for processing based on the location of objects in an image.

Figure 5:
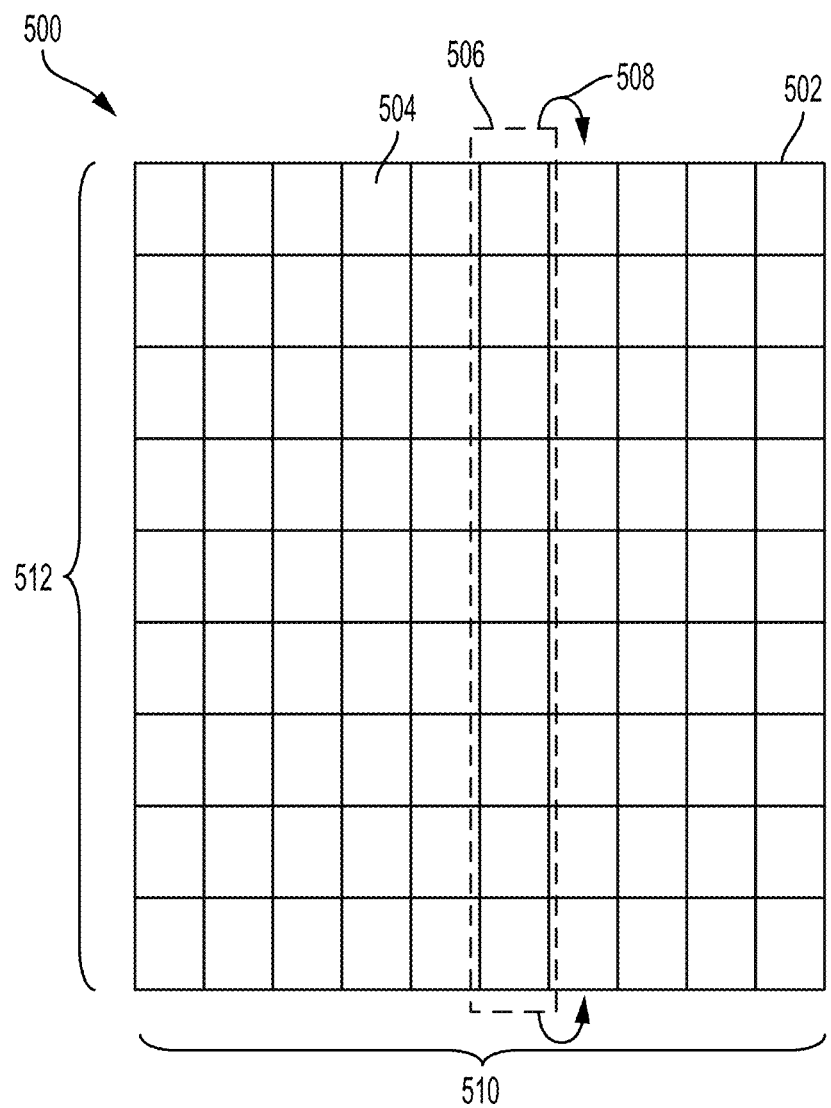
FIG. 5 illustrates an example image sensor, according to an example implementation.

FIG. 5 illustrates an example image sensor 500, according to an example implementation. The image sensor 500 may be a CMOS image sensor and similar to image sensor 400 of FIG. 4. In some examples, image sensor 500 may be taller than it is wide (i.e. may have more horizontal rows than vertical columns). The image sensor 500 may similarly comprise a grid 502 of sensor cells 504. The grid 502 of sensor cells 504 may be arranged in columns 510 and rows 512. The image sensor 500 may be configured to receive light by way of an optical system. During operation, the sensor cells 504 may receive light and convert the light into electrical signals. The electrical signals may correspond to the color and intensity of light that is received by a respective sensor cell.

In order to form an image, an image processor, such as a processor described with respect to FIG. 1 and/or FIG. 3B may control a sampling of the image sensor 500. As shown in FIG. 5, the image sensor 500 may be sampled one column 506 at a time. As previously discussed, in some examples, the image sensor 500 may be configured to samples more rows (such as 2, 4, 5, 8, etc.) at a time rather than one. Unlike image sensor 400 of FIG. 4, the image sensor 500 of FIG. 5 is sampled in columns rather than rows. The image sensor 500 may be sampled in an iterative fashion and incrementally adjust the sample column 508. The processor may incrementally sample the column 510 of image sensor 500 by iteratively incrementing the sample column 510. In some examples, the iterations may be linear, that is after each row sampled the next row is subsequently sampled. In other examples, the sampling may be performed in different ways. In some examples, the sampling may be performed on columns in a non-sequential order.

By sampling the image sensor 500 of FIG. 5 in columns 510 as opposed to rows 512, the distortion caused by the iterative sampling may be mitigated. Thus, the skew as described with respect to the traditional image sensor 400 of FIG. 4 may be mitigated. Rather than a horizontal skew, the sampling described with respect to FIG. 5 there may have a vertical skew and horizontal compression (or expansion) of moving objects. In some instances, having a horizontal compression or expansion may be more desirable than the horizontal skew of the traditional sensor.

Figure 6:
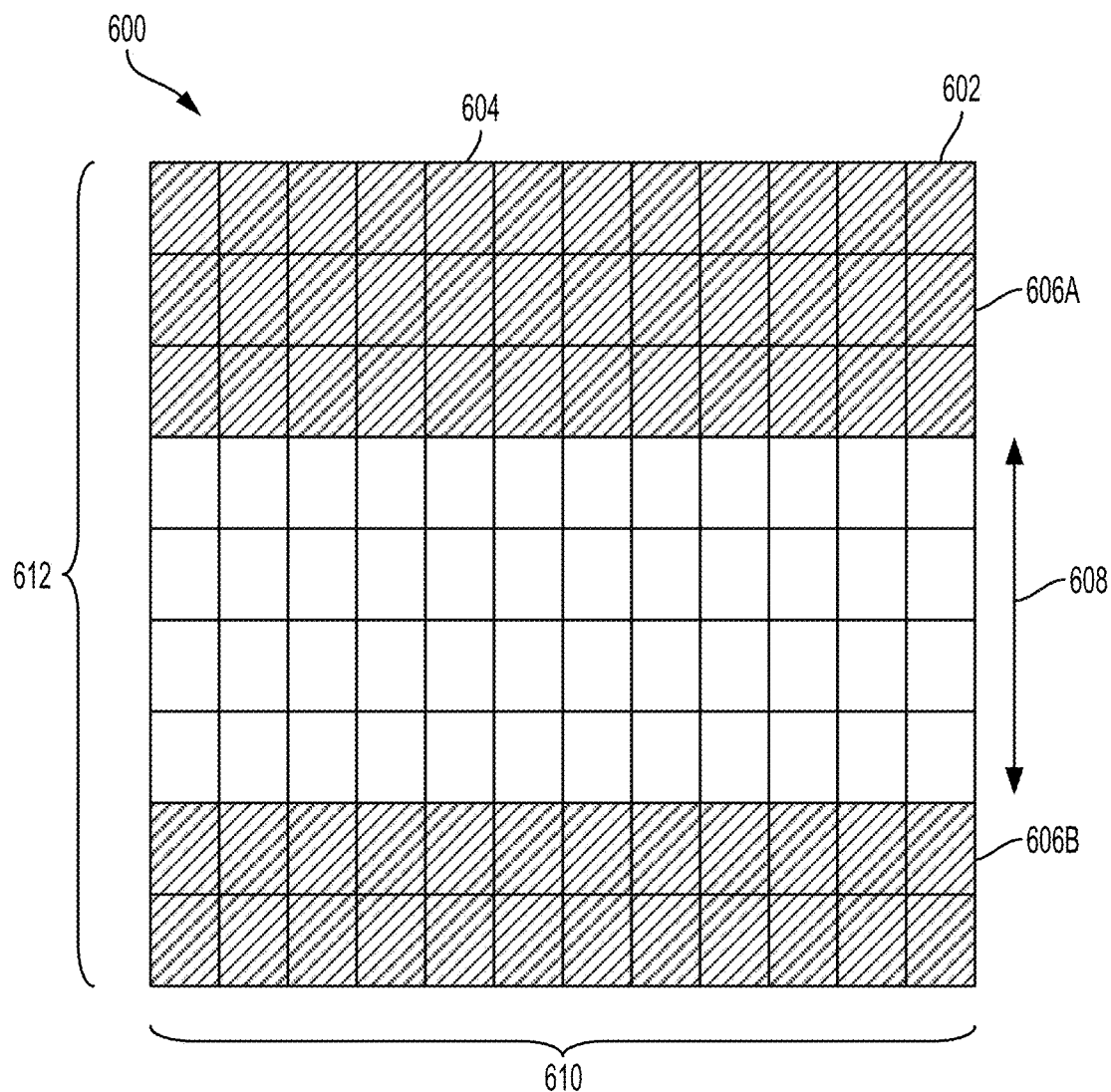
FIG. 6 illustrates an example image sensor, according to an example implementation.

FIG. 6 illustrates an example image sensor 600, according to an example implementation. The image sensor 600 may be a CMOS image sensor and similar to the previously-discussed image sensors. The image sensor 600 may similarly comprise a grid 602 of sensor cells 604. The grid 602 of sensor cells 604 may be arranged in columns 610 and rows 612. Unlike the previously-discussed image sensors, image sensor 600 may have both an enabled region 608 and at least one disabled region. As shown in FIG. 6, image sensor 600 has a top disabled region 606A and a bottom disabled region 606B.

Each horizontal row provides a corresponding portion of the overall vertical field of view (e.g., overall vertical field of view 388). Each vertical column provides a corresponding portion of the overall horizontal field of view (e.g., horizontal field of view 390). Thus, the imaged field of view corresponds to the field of view provided by the rows and columns in enabled region 608.

The image sensor 600 may be configured to receive light by way of an optical system. During operation, the optical system may expose all of the sensor cells 604 to light. However, only the enabled cells in the enabled cell region 608 provide image data.

In various examples, the enabled region 608 and the disabled regions 606A and 606B may be defined in different ways. In some examples, the enabled region 608 may be defined as a region in which the cells 602 are powered and disabled regions 606A and 606B have cells 602 that are not powered. In this example, only powered cells produce a signal output. In other examples, the enabled region 608 may be defined as a region in which a processor captures data from the cells 602. In this example, the processor may selectively only sample cells in a region that is defined to be enabled. In other examples, different methods of enabling or disabling cells may be used.

Figure 7:
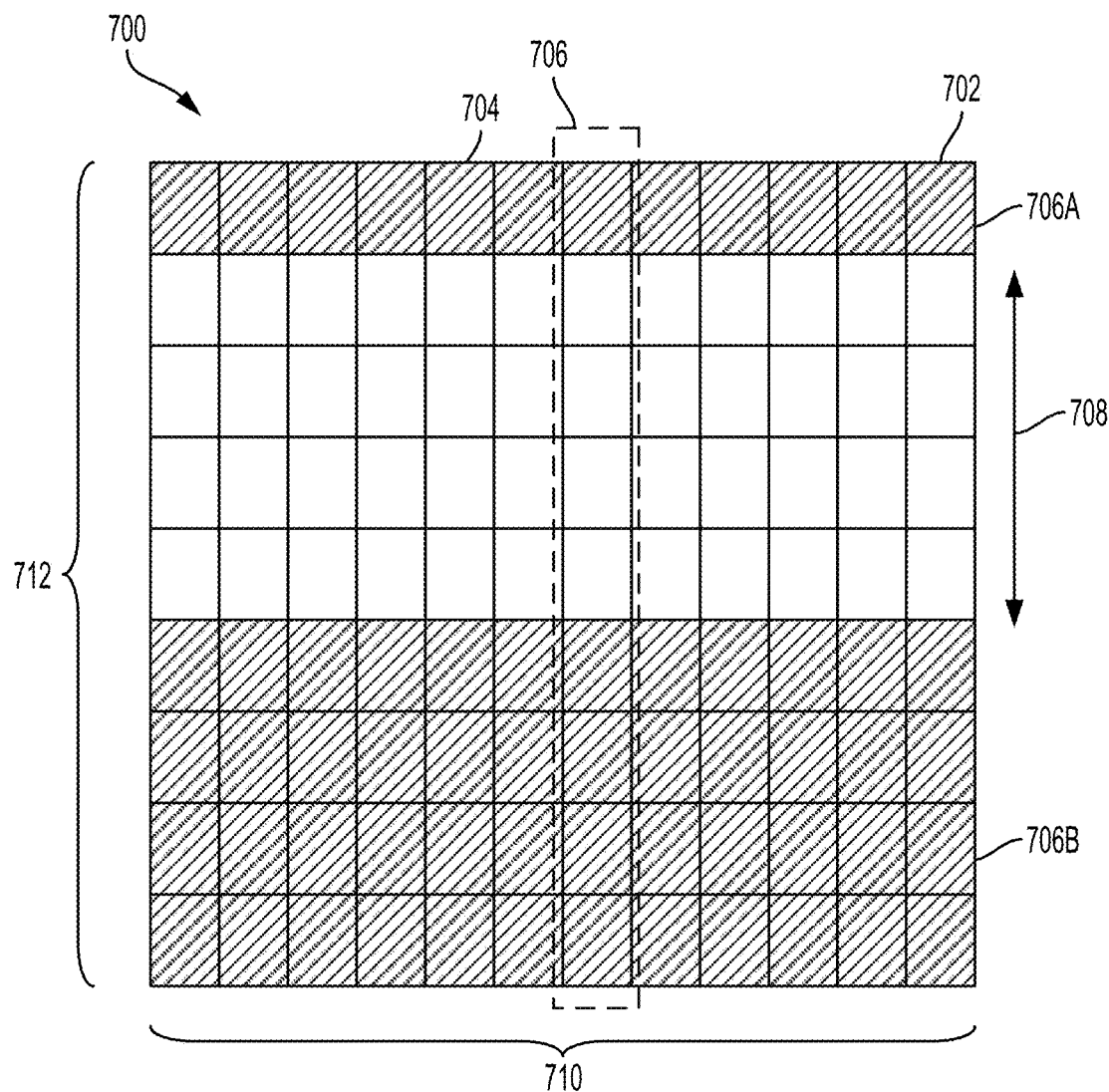
FIG. 7 illustrates an example image sensor, according to an example implementation.

FIG. 7 illustrates an example image sensor 700, according to an example implementation. The image sensor 700 may be a CMOS image sensor and similar to the previously-discussed image sensors. The image sensor 700 may similarly comprise a grid 702 of sensor cells 704. The grid 702 of sensor cells 704 may be arranged in columns 710 and rows 712. Similar to image sensor 600 of FIG. 6, image sensor 700 may have both an enabled region 708 and at least one disabled region. As shown in FIG. 7, image sensor 700 has a top disabled region 706A and a bottom disabled region 706B.

The image sensor 700 may be configured to receive light by way of an optical system. During operation, the optical system may expose all of the sensor cells 704 to light. However, only the enabled cells in the enabled cell region 708 may provide image data.

Image sensor 700 may be the same image sensor as image sensor 600 of FIG. 6, but having an adjusted enabled region 708. In some examples, an image processor may be able to adjust the enabled region 708. For example, the enabled region 708 may move to a region that is higher or lower (as measured by rows) on the image sensor. In other examples, the number of rows of the enabled region 708 may be increased or decreased.

FIG. 8 is a flow chart of a method 800, according to an example implementation. Method 800 represents an example method that may include one or more operations as depicted by one or more of blocks 802-808, each of which may be carried out by any of the systems shown in FIGS. 1-7, among other possible systems. In an example implementation, a computing system such as camera system 350 performs the illustrated operations, although in other implementations, one or more other systems (e.g., server computing system 306) can perform some or all of the operations.

Those skilled in the art will understand that the flowcharts described herein illustrates functionality and operations of certain implementations of the present disclosure. In this regard, each block of the flowcharts may represent a module, a segment, or a portion of program code, which includes one or more instructions executable by one or more processors for implementing specific logical functions or steps in the processes. The program code may be stored on any type of computer readable medium, for example, such as a storage device including a disk or hard drive.

In addition, each block may represent circuitry that is wired to perform the specific logical functions in the processes. Alternative implementations are included within the scope of the example implementations of the present application in which functions may be executed out of order from that shown or discussed, including substantially concurrent or in reverse order, depending on the functionality involved, as would be understood by those reasonably skilled in the art. Within examples, any system may cause another system to perform one or more of the operations (or portions of the operations) described below.

In line with the discussion above, a computing system (e.g., camera system 350, remote computing system 302 or server computing system 306) may operate as shown by method 800. As shown in FIG. 8, at block 802, the computing system operates receiving light at light sensor via an optical system. The sensor may be configured with a plurality of cells aligned in a plurality of horizontal rows and a plurality of vertical columns. The sensor is configured to have an overall vertical field of view and an overall horizontal field of view of an external environment of the apparatus. Each horizontal row provides a corresponding portion of the overall vertical field of view and each vertical column provides a corresponding portion of the overall horizontal field of view.

At block 804, the optical system operates by dividing the plurality of horizontal rows of the light sensor into one or more enabled rows and one or more disabled rows. The rows may be divided as previously discussed with respect to FIGS. 6 and 7. In some examples, a processor local to the vehicle may make a determination of which rows should be enabled. In other examples, a remote computer system, such as an assisted perception system can determine which cells should be selected. By dividing the rows, the image sensor only images a portion of the original field of view corresponding to the enabled rows.

Additionally, the image sensor may be coupled to a processor configured to do image processing, such as one of the processors described with respect to FIG. 1 or FIG. 3B. The image processing may include image compression, object recognition, etc. When the sensor captures image data, the image data may consume a relatively large amount of data. Because of large amount of data, storage, processing, and moving data may be computationally and memory intensive. To reduce the computational and memory needs of the system, only a portion of the sensor may be selected (that is, enabled) at any given time. For example, a region of the sensor may be disable and sampling of sensor cells may only be performed on the enabled portion. In practice, half of the cells of the sensor may be enabled at any given time. In some examples, the disabled portion may be one or more regions of the sensor. The disabled regions may be a plurality of rows at the top or bottom of the sensor. In a default mode, the top 25% of the rows of the sensor and the bottom 25% of the rows of the sensor may be disabled. This would leave the middle 50% of the rows enabled.

The region of the sensor that is enabled may correspond to a field of view of the sensor. By disabling a top or bottom portion of the sensor, the field of view may be reduced to only contain a center portion of what would have been the full image of the fully-enabled sensor. In some examples, the processor may be further configured to adjust the enabled portion of the sensor.

In practice, this may cause the field of view to adjust in an upward or downward looking direction or expand or contract the field of view. The enabled portion may be adjusted to capture a different field of view the default field of view. For example, when a vehicle pulls up to a stoplight, the stoplight may be mounted higher than normal. The processor may adjust the enabled rows of the sensor so that the field of view captures the stoplight. The processor may adjust the portion of the sensor that is enabled in different ways. In some examples, the portion of the sensor is enabled is based on map data stored in the memory of the apparatus. For example, the map data may indicate a change in the grade of the roadway or an object near the roadway may be located higher or lower than normal and the processor may responsively adjust the enabled region of the sensor to keep a portion of the roadway within the field of view of the sensor or to make sure the object is within the field of view of the sensor.

In another example, the system may include an inertial measurement unit (IMU) and the portion of the sensor that is enabled may be based on data from the IMU. For example, the IMU data may indicate a change in the grade of the roadway and the processor may responsively adjust the enabled region of the sensor to keep a portion of the roadway within the field of view of the sensor.

In some further examples, the portion of the sensor is enabled is based on an object detected in the image data. For example, a road sign may be located partially in the field of view of the sensor and the processor may adjust the enabled region to have the full road sign located in the field of view.

In yet some further examples, there may be a potential object located wholly or partially in the field of view of the sensor. The processor may adjust the enabled region to have the potential object located in the field of view. A processing system may then determine if the potential object is actually an object and classify the object.

At block 806 (or at block 808) the optical system operates by obtaining image data from the light sensor by sampling one or more cells in the one or more enabled rows without sampling the cells in the one or more disabled rows. The image data images a portion of the overall vertical field of view, and the imaged portion of the vertical field of view corresponds to the one or more portions of the vertical field of view provided by the one or more enabled rows. The image data may be received by sampling a plurality of cells from the enabled rows to form image data. The sampling may be performed across at least one of the vertical columns of the sensor. As previously discussed, the optical camera may have an image sensor, such as a CMOS image sensor. An image sensor may include a plurality of sensor cells configured in rows and columns. To capture image data, the cells of the sensor may be sampled to obtain the image data. The image sensor may be configured with a rolling shutter. A rolling shutter generally will iteratively sample the image sensor to capture image data. The data from the image sensor may form an image, a plurality of images, or a video.

A rolling shutter may introduce some distortions in the captured image. Distortions are caused by the iterative sampling of the image sensor. The image sensor of the present disclosure may be sampled with a rolling shutter that samples the cells of the sensor in vertical columns. By sampling the image sensor in columns as opposed to rows, the distortion caused by the iterative sampling may be mitigated. Rather than a horizontal skew, there may be a vertical skew and horizontal compression (or expansion) of moving objects. In some instances, having a horizontal compression or expansion may be more desirable than the horizontal skew of the traditional sensor.

At each cell that makes up a column being sampled, the cells that are enabled may output an electrical signal. This electrical signal output by each respective cell may be in proportion to the light that hits each respective cell. For each enabled cell of a column, data is captured based on the electrical signal. After each cell of a row has been sampled, a new column may be sampled to create another column of an image. The columns may be sampled iteratively until all the columns have been sampled.

At block 808, the computing system operates by providing storing the image data in a memory of the apparatus. The image data may be stored in a raw format, that is unprocessed directly as captured. In other examples, the image data may be stored in temporary memory, such as a cache, for further processing. The image data may be compressed or manipulated before being stored in a memory. The memory may be a memory within the optical system, a memory of the apparatus that is not part of the optical system, and/or the memory may be a memory that is located at a remote computer system.

In some examples, the image data may be used by a vehicle control system to determine a vehicle instruction for execution by the autonomous vehicle. For example, a vehicle may be operating in an autonomous mode and alter its operation based on information or an object captured in an image. In some examples, the image data may be related to a different control system, such a remote computing system, to determine a vehicle control instruction. The autonomous vehicle may receive the instruction from the remote computing system and responsively alter its autonomous operation.

Additionally, in some examples, the autonomous vehicle may receive a request from the remote computing system to adjust an enabled portion of the sensor based on image data transmitted to the remote computing server. In response to receiving the request to adjust the enabled portion of the sensor, the processor of the vehicle may adjust the sensor and transmit an image from the adjusted sensor back to the remote computing system.

Figure 9:
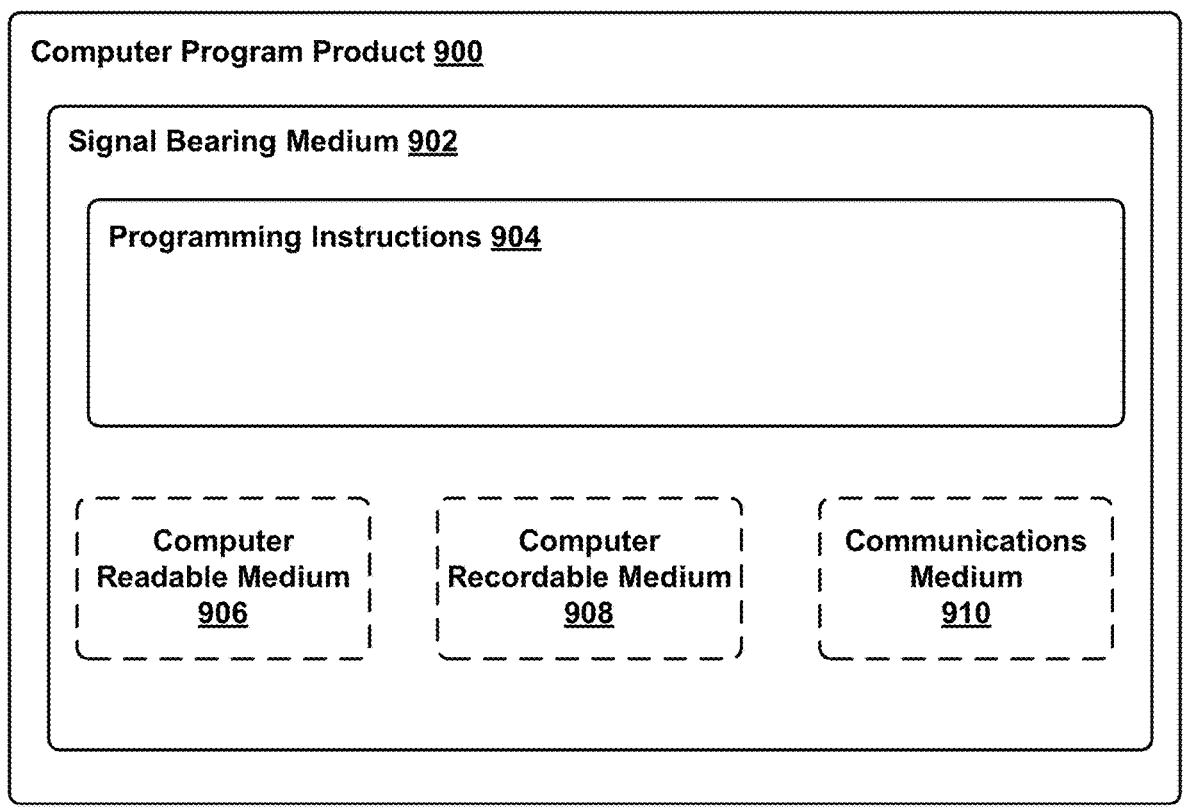
FIG. 9 is a schematic diagram of a computer program, according to an example implementation.

FIG. 9 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In an example implementation, computer program product 900 is provided using signal bearing medium 902, which may include one or more programming instructions 904 that, when executed by one or more processors may provide functionality or portions of the functionality described above with respect to FIGS. 1-8. In some examples, the signal bearing medium 902 may encompass a non-transitory computer-readable medium 906, such as, but not limited to, a hard disk drive, a CD, a DVD, a digital tape, memory, components to store remotely (e.g., on the cloud) etc. In some implementations, the signal bearing medium 902 may encompass a computer recordable medium 908, such as, but not limited to, memory, read/write (R/W) CDs, R/W DVDs, etc. In some implementations, the signal bearing medium 902 may encompass a communications medium 910, such as, but not limited to, a digital and/or an analog communication medium (e.g., a fiber optic cable, a waveguide, a wired communications link, a wireless communication link, etc.). Similarly, the signal bearing medium 902 may correspond to a remote storage (e.g., a cloud). A computing system may share information with the cloud, including sending or receiving information. For example, the computing system may receive additional information from the cloud to augment information obtained from sensors or another entity. Thus, for example, the signal bearing medium 902 may be conveyed by a wireless form of the communications medium 910.

The one or more programming instructions 904 may be, for example, computer executable and/or logic implemented instructions. In some examples, a computing device such as the computer system 112 of FIG. 1 or remote computing system 302 and perhaps server computing system 306 of FIG. 3A or one of the processor of FIG. 3B may be configured to provide various operations, functions, or actions in response to the programming instructions 904 conveyed to the computer system 112 by one or more of the computer readable medium 906, the computer recordable medium 908, and/or the communications medium 910.

The non-transitory computer readable medium could also be distributed among multiple data storage elements and/or cloud (e.g., remotely), which could be remotely located from each other. The computing device that executes some or all of the stored instructions could be a vehicle, such as vehicle 200 illustrated in FIG. 2. Alternatively, the computing device that executes some or all of the stored instructions could be another computing device, such as a server.

The above detailed description describes various features and operations of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
   receiving, at a computing device, first sensor data from a first sensor coupled to a vehicle, wherein the vehicle is navigating on a road in an environment, and wherein the first sensor corresponds to a lidar unit or a radar unit;
   detecting, based on the first sensor data, an object located in the environment;
   adjusting, based on a height of the object, a cell grid for a second sensor into one or more enabled cell rows and one or more disabled cell rows to modify a field of view of the second sensor to align with the height of the object;
   receiving, at the computing device and from a third sensor, third sensor data representing a grade of the road;
   adjusting, based on the grade of the road, the one or more enabled cell rows and the one or more disabled cell rows to further modify the field of the view of the second sensor;

receiving, at the computing device and from the second sensor, second sensor data representing a portion of the environment comprising the object, wherein the second sensor refrains from sampling the one or more disabled cell rows in the cell grid when generating the second sensor data representing the portion of the environment;

mapping the portion of the environment using the second sensor data; and controlling the vehicle based on the mapped portion of the environment.

2. The method of claim 1, wherein receiving first sensor data from the first sensor coupled to the vehicle comprises:
receiving radar data from the radar unit coupled to the vehicle, wherein the radar data indicates a position of a road boundary relative to the vehicle.

3. The method of claim 1, wherein receiving second sensor data comprises:
vertically sampling the one or more enabled cell rows in the cell grid of the second sensor using a rolling shutter.

4. The method of claim 1, wherein the second sensor is coupled to the vehicle at a fixed orientation.

5. The method of claim 1, wherein receiving first sensor data from the first sensor comprises:
receiving point cloud data representing the environment from the lidar unit.

6. The method of claim 1, wherein the object is a stoplight.

7. The method of claim 1, wherein adjusting the cell grid for the second sensor comprises:
disabling cell rows corresponding to a top portion and a bottom portion of the cell grid of the second sensor.

8. The method of claim 1, wherein receiving second sensor data representing the portion of the environment comprising the object comprises:
generating image data via sampling the one or more enabled cell rows without sampling the one or more disabled cell rows.

9. The method of claim 8, wherein generating the image data comprises:
incrementally sampling cells of the one or more enabled cell rows in accordance with one or more vertical columns of the cell grid.

10. The method of claim 1, wherein adjusting the cell grid for the second sensor comprises:
adjusting the cell grid to shift the field of view of the second sensor in an upward or downward direction.

11. The method of claim 1, wherein adjusting the cell grid for the second sensor comprises:
adjusting the cell grid to expand or contract the field of view of the second sensor.

12. The method of claim 1, wherein adjusting the cell grid for the second sensor comprises:
enabling one or more previously disabled cell rows to modify the field of view of the second sensor.

13. The method of claim 12, wherein adjusting the cell grid for the second sensor comprises:
disabling one or more enabled cell rows to modify the field of view of the second sensor.

14. A system comprising:
a first sensor, a second sensor, and a third sensor, wherein the first sensor, the second sensor, and the third sensor are coupled to a vehicle, wherein the vehicle is navigating on a road in an environment, and wherein the first sensor corresponds to a lidar unit or a radar unit;
a computing device configured to:
receive first sensor data from the first sensor;
detect, based on the first sensor data, an object located in the environment;
adjust, based on a height of the object, a cell grid for the second sensor into one or more enabled cell rows and one or more disabled cell rows to modify a field of view of the second sensor to align with the height of the object;
receive, from a third sensor, third sensor data representing a grade of the road;
adjust, based on the grade of the road, the one or more enabled cell rows and the one or more disabled cell rows to further modify the field of view of the second sensor;
based on further modifying the field of view of the second sensor, receive, from the second sensor, second sensor data representing a portion of the environment comprising the object, wherein the second sensor refrains from sampling the one or more disabled cell rows in the cell grid when generating the second sensor data representing the portion of the environment;
map the portion of the environment using the second sensor data; and
control the vehicle based on the mapped portion of the environment.

15. The system of claim 14, wherein the first sensor is the radar unit coupled to the vehicle, and wherein the first sensor data is radar data that indicates a position of a road boundary relative to the vehicle.

16. The system of claim 14, wherein the computing device is further configured to:
vertically sample the one or more enabled cell rows in the cell grid of the second sensor using a rolling shutter to receive the second sensor data.

17. The system of claim 14, wherein the second sensor is coupled to the vehicle at a fixed orientation.

18. A non-transitory computer-readable medium configured to store instructions, that when executed by a computing system comprising one or more processors, causes the computing system to perform operations comprising:
receiving first sensor data from a first sensor coupled to a vehicle, wherein the vehicle is navigating on a road in an environment, and wherein the first sensor corresponds to a lidar unit or a radar unit;
detecting, based on the first sensor data, an object located in the environment;
adjusting, based on a height of the object, a cell grid for a second sensor into one or more enabled cell rows and one or more disabled cell rows to modify a field of view of the second sensor to align with the height of the object;
receiving, from a third sensor, third sensor data representing a grade of the road;
adjusting, based on the grade of the road, the one or more enabled cell rows and the one or more disabled cell rows to further modify the field of view of the second sensor;
based on further modifying the field of view of the second sensor, receiving, from the second sensor, second sensor data representing a portion of the environment comprising the object, wherein the second sensor refrains from sampling the one or more disabled cell rows in the cell grid when generating the second sensor data representing the portion of the environment; and
mapping the portion of the environment using the second sensor data; and controlling the vehicle based on the mapped portion of the environment.

19. The non-transitory computer-readable medium of claim 18, wherein receiving the second sensor data comprises:
vertically sampling the one or more enabled cell rows in the cell grid of the second sensor using a rolling shutter.

* * * * *